Feb. 28, 1928.
C. R. McMINN ET AL
1,660,846
ANTISLAP PISTON RING
Filed Nov. 13, 1926
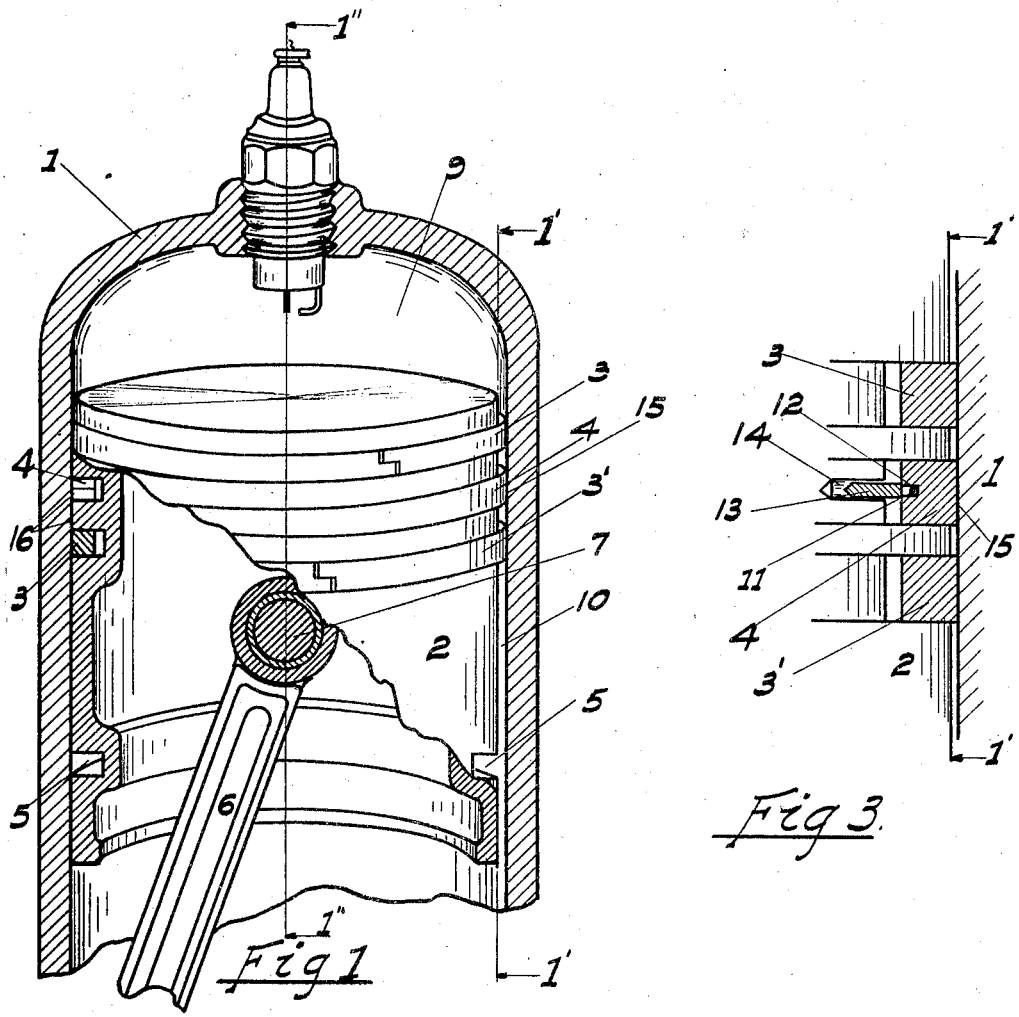
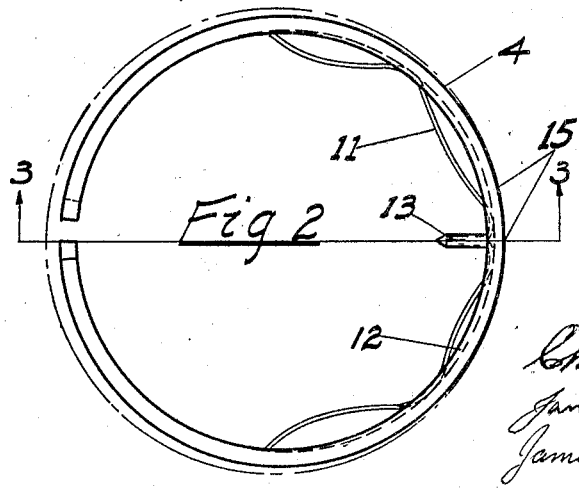
INVENTORS.
Charles R. McMinn
James B. Holliday
James T. Robinson Patented Feb. 28, 1928.

1,660,846

UNITED STATES PATENT OFFICE.

CHARLES RICHARD McMINN, JAMES BLAIR HOLLIDAY, AND JAMES THOMAS ROBINSON, OF LOS ANGELES, CALIFORNIA.

ANTISLAP PISTON RING.

Application filed November 13, 1926. Serial No. 148,307.

Our invention relates to piston rings and has for its principal object the provision of a piston ring containing an expansible reinforcing element used in conjunction with regular packing and seal rings for the prevention of piston slap and maintaining axial alignment of the piston during its reciprocation with respect to the axis of the cylinder.

Other objects are: less wall pressure, therefore less friction and consequently less heat developed.

It eliminates pinging and allows motor compression to be raised.

It steadies piston travel alongside of cylinder wall since the tension in the expansible and reinforcing element will not allow the anti-slap ring to break contact with the cylinder wall. This contact is assured by having a nub on the reinforcing element positioned in the piston and the semi-circular groove containing the element also limits the movement of the anti-slap ring to the amount the groove is in excess of the element when it is embedded in the groove.

On high compression it eliminates knock and reduces piston drag.

These and other objects being suggestive upon reference to the drawing, wherein Fig. 1 is a fragmentary section taken through any ordinary type of combustion engine showing the cylinder in vertical section, a piston contained therein, having three rings, a top ring 3, a bottom ring 3′ and an anti-slap ring 4 therebetween, a portion of one wall of the piston being in section and illustrating the relation of the piston with respect to the cylinder wall opposite the side containing the reinforcing element and also a sufficient amount of the face being broken away to show the connecting rod 6 and wrist pin 7 connected thereto.

Fig. 2 is a plan view of our anti-slap ring in combination with its expansible and reinforcing element apart from the piston and cylinder thus illustrating their normal positions when unconstrained and also the reinforced point of contact of ring and cylinder wall when constrained.

Fig. 3 is an enlarged view showing only a portion of the assembled rings in vertical section with respect to a diagrammatic view of the piston and cylinder taken on line 3—3 of Fig. 2, the central ring being best suited to illustrate, how and where the reinforcing element should be applied and held in the piston.

In the drawing Fig. 1; a piston 2 is reciprocable in the cylinder 1. The axis of this reciprocation is vertically shown on 1″—1″.

An exaggerated clearance is shown between the cylinder wall and the lines 1′—1′ of the piston limitations.

In smaller type pistons having only two grooves in the upper part, the oil ring is placed on the lower portion of the piston as indicated by the numeral 5 and the anti-slap ring is placed second from the top.

In actual practice and under the most perfect working conditions when the gases are compressed and exploded in the combustion chamber 9 there is a tendency of the piston to tilt or rotate a fractional amount about the wrist pin 7 as an axis and in a clockwise direction manifestly due to the fact that the piston rings are peripherally resilient and do not hold the piston in axial alignment.

To overcome this difficulty two spark plugs have been inaugurated and the piston head has been slightly tapered and sometimes recessed but as yet piston slap had not entirely been removed.

By instituting a ring 4 such as applicants as indicated, it can readily be seen how easily alignment with the cylinder wall can be obtained, by reinforcing a portion of the ring so as not to give peripherically as rings now in use but instead create a tension sufficient to always maintain an abutment with one side of the piston and the cylinder wall, thus equating the tension in the spring to the force tending to produce the rock in the piston.

Our improved principle comprises a ring 4 partially grooved as indicated by the numeral 12. When the ring is compressed about the piston one side is reinforcedly held flush with the cylinder wall as indicated by 15, the other side of the piston as shown at 16 always abutting on the cylinder wall, at the same time the anti-slap ring has perfect circumferential contact with the cylinder wall and the piston easy reciprocation therein.

In Fig. 2 this is further illustrated by the dot and dash line representing the inner wall of the cylinder, the reinforced contacting point of the anti-slap ring and cylinder again being indicated at 15.

The reinforcing element 11 is completely recessed in the groove 12 when installed and the pin 13 integral therewith is inserted in a hole 14 in the piston thereby always maintaining a deformity of the ring on the right hand side of the cylinder and at right angles to the wrist pin 7, the force in the expansible element being sufficient to expand the ring the clearance which is allowed between the piston and the cylinder.

The resilient element 11 or expansible reinforcement as shown is a winged wire spring of sinus form bent so that when it is compressed it will insure regularity and maintain contact of the piston and cylinder not only during explosion but throughout its stroke.

The said element could be a flat wave member. It is adaptable to use on any type ring other than a spring ring such as an asbestos, packing, rubber or the like. Our idea is intended to cover any type ring which may be caused to be expanded and contact frictional engagement of the piston with the cylinder wall for the prevention of piston slap.

The resilient element 11 when installed in the ring consumes properly an arc of 180° of abutment on the inner groove of the piston.

It may be necessary to increase this angle 30° more on larger type pistons.

We claim:

1. An anti-slap ring containing a semi-circumferential groove on the inner periphery thereof and opposite its trans-split ends; a resilient element adapted to be inserted in said groove and a protuberance integral therewith to hold said element against movement.

2. An anti-slap ring containing a slotted arc in its inner periphery and opposite its trans-split ends in combination with a wave like resilient element which is adapted to be compressed in said slot and a pin integral therewith to hold said element against movement.

3. A piston ring having a partial semicircumferential groove in its inner periphery in combination with a sinus resilient member having a protuberance, said protuberance fractionally limiting the circumferential rotation of the piston ring and fixedly holding said resilient member against movement.

4. A piston ring containing a semi-circular groove in its inner periphery, the foci connecting the remote ends thereof forming an angle which lies in a plane adjacent to the trans-split portion of said ring; a sinus resilient member having a protuberance in combination therewith, the sinus ends of said resilient member adapted to be contained in aforesaid semi-circular groove and a pocket for inserting aforesaid protuberance to hold said combination against movement.

5. An anti-slap ring semi-circumferentially grooved on its inner periphery opposite its trans-split ends and a semi-sinus member having a protuberance projecting therefrom which is adapted to be inserted in said groove in combination with a piston member reciprocable in a cylinder member containing a plurality of grooves, one of said grooves containing a recess for inserting said protuberance, the outer periphery of said anti-slap ring opposite said trans-split ends being thereby deformed so as to always insure abutment on the side of said cylinder member with which it engages.

6. In combination with a piston and cylinder member, wherein said piston member contains a plurality of circular grooves, of an anti-slap ring contained in one of said grooves for axially aligning said piston with said cylinder during the reciprocation of said piston, said anti-slap ring containing a reinforcing element which occupies an arced groove in the inner periphery of said ring whereby to protuberate said ring so as to always insure abutment against the wall of said cylinder alongside of said reinforcing element and a pin integral with said reinforcing element for fixedly holding said element in position and fractionally limiting the circumferentially rotation of the anti-slap ring.

In testimony whereof, we have hereunto affixed our signatures.

CHARLES RICHARD McMINN.
JAMES BLAIR HOLLIDAY.
JAMES THOMAS ROBINSON.